United States Patent [19]

Fasen et al.

[11] Patent Number: 4,767,977
[45] Date of Patent: Aug. 30, 1988

[54] BATTERY CHARGER

[75] Inventors: Kenneth R. Fasen, San Diego; Kim R. Rogers, Vista; Lee J. Schwartz, San Diego, all of Calif.

[73] Assignee: HM Electronics, Inc., San Diego, Calif.

[21] Appl. No.: 1,654

[22] Filed: Jan. 8, 1987

[51] Int. Cl.[4] .............................. H02J 7/00
[52] U.S. Cl. ...................... 320/20; 320/23; 320/32; 320/39; 320/48
[58] Field of Search ............... 320/23, 31, 32, 39, 320/48, 20

[56] References Cited

U.S. PATENT DOCUMENTS

| 4,327,317 | 4/1982 | Heine et al. | 320/23 |
| 4,388,582 | 6/1983 | Saar et al. | 320/39 |
| 4,392,101 | 7/1983 | Saar et al. | 320/39 |
| 4,503,378 | 3/1985 | Jones et al. | 320/39 |

Primary Examiner—Patrick R. Salce
Assistant Examiner—Anita M. Ault
Attorney, Agent, or Firm—Bernard L. Kleinke

[57] ABSTRACT

The battery charger includes a slope detector which responds to the battery voltage of the battery being charged, to generate a peak indicating signal, when the voltage decreases following the peak charging voltage of the battery. A peak hold device responds to the peak indicating signal to cause the charger to switch abruptly from a high charge mode to a low trickle charge mode.

29 Claims, 2 Drawing Sheets

BATTERY CHARGER

DESCRIPTION

1. Technical Field

The present invention relates in general to battery chargers, and it more particularly relates to a battery charger which protects the battery from inadvertently subjecting it to excessive charging currents that could otherwise cause damage to the battery.

2. Background Art

Battery chargers have been employed for restoring the electrical charge for a discharged rechargeable battery. When a discharged battery has been connected to a prior known battery charger for recharging purposes, the charging cycle has started with a charging current being supplied to the battery. After the battery became fully charged, the charging current has been terminated, and has been followed by a trickle charge. The switching to the smaller trickle charge is necessary to prevent unwanted heat build-up, and thus possible damage to the battery.

For the purpose of switching from a charging current to a trickle current, automatic switching could occur after a pre-determined period of time, from the beginning of the charging process. However, such a method would not be precise and positive. Each battery has its own charging characteristic, and a delay in the switching could cause undesirable excessive heat build-up inside the battery, thereby causing irreparable damage to the battery, and shortening its useful life.

Conventional battery chargers have attempted to use microprocessors and analog-to-digital converters, to cause the switching to occur at a peak charging voltage. In this regard, computerized techniques have been devised, to detect the beginning of a decreasing battery voltage characteristic, immediately following the peak charging voltage, and to cause the switching to occur in response thereto. In order to prevent unwanted overexposure of the battery being charged to high charging currents, the switching to the lower trickle changing currents, should be accomplished as quickly and precisely as possible following the peak or knee of the charging characteristic for the battery. Such fast and accurate switching has not been achieved satisfactorily by the prior known computerized techniques, for many applications.

The conventional computerized solution is inaccurate, since it mainly relies on the sampling and quantizing of the charging voltage. For example, when the negative charging characteristic slope is very gradual, the sampling process often times does not react quickly and accurately enough. Repeated readings over a relatively long period of time must be taken to detect the beginning of the negative slope. Thus, the inherent inaccuracy of the prior circuits can cause unwanted delays in switching from the fast charge mode to the trickle charge mode, and thus can cause possible excessive and damaging heat build-up inside the battery being charged.

The conventional computerized chargers are also overly sensitive to extraneous voltage spikes or spurious signals, which can cause the system to malfunction. In this regard, computer systems are inherently sensitive to such spurious signals, which can cause stored signals to be obliterated, and thus cause the system to cease operation, thereby exposing expensive rechargeable batteries to damage resulting from over charging.

Therefore, it would be desirable to have a battery charger which overcomes more satisfactorily the foregoing-mentioned problems of overexposure to high charging currents. Such a battery charger should enable the automatic switching from a fast charge mode to a trickle charge mode to occur precisely and abruptly, at a desired time, soon after the peak charging voltage is reached. The charger should also be tolerant to extraneous voltage spikes or other spurious signals. It should be relatively inexpensive to manufacture, and should be relatively simple to operate and to maintain.

DISCLOSURE OF INVENTION

Therefore, it is the principal object of the present invention to provide a new and improved battery charger, which prevents, or at least greatly reduces the possibility of excessive and damaging heat build-up inside the battery resulting from an inadvertant overexposure to high charging currents.

Another object of the present invention is to provide such a new and improved battery charger, which is tolerant to extraneous voltage spikes or other spurious signals, and which is simple to operate and to maintain, and relatively inexpensive to manufacture.

Briefly, the above and further objects and features of the present invention are realized by providing a battery charger which protects the battery being charged from overexposure to charging currents.

The battery charger includes a slope detector which responds to the battery voltage of the battery being charged, to generate a peak indicating signal, when the voltage decreases following the peak charging voltage of the battery. A peak hold device responds to the peak indicating signal to cause the charger to switch abruptly from a high charge mode to a low trickle charge mode.

BRIEF DESCRIPTION OF DRAWINGS

The above mentioned and other objects and features of this invention and the manner of attaining them will become apparent, and the invention itself will be best understood by reference to the following description of an embodiment of the invention in conjunction with the accompany drawings, wherein.

BEST MODE FOR CARRYING OUT THE INVENTION

Figure 1:
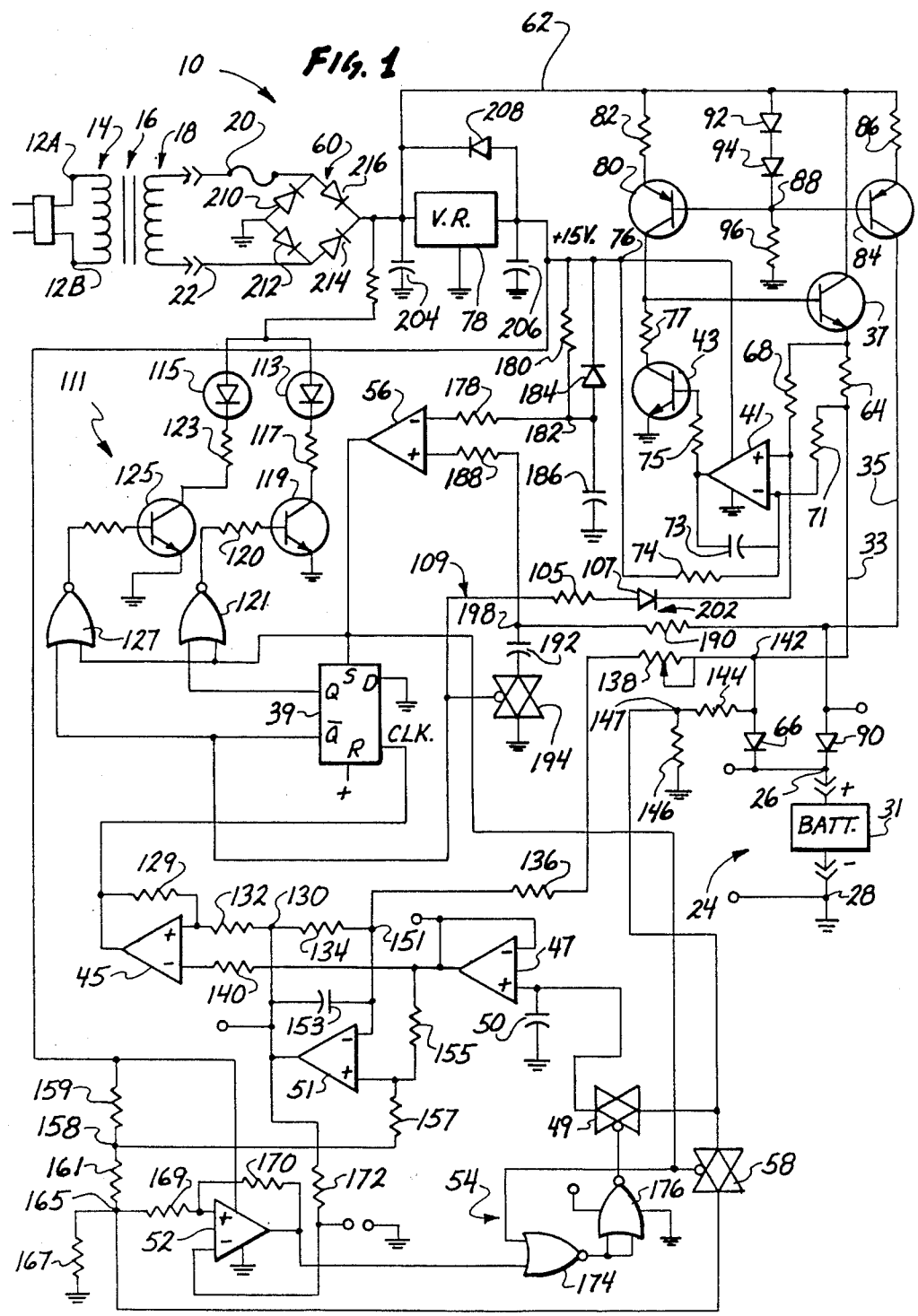
FIG. 1 is a schematic circuit diagram of a battery charger constructed according to the invention, for charging a battery.

Referring to the drawings and more particularly to FIG. 1, there is illustrated a battery charger 10, which is constructed in accordance with the present invention.

The battery charger 10 is electrically energized at the terminals 12A and 12B aoross an input winding 14 of a transformer 16, by a suitable source of electrical power (not shown), such as an a.c. power line. A transformer output winding 18 is connected to a pair of terminals 20 and 22 of a bridge rectifier circuit 60. The output 24 of the battery charger 10 includes a pair of output terminals or jacks 26 and 28, to connect across a battery 31 electrically, for charging purposes.

The battery charger 10 generally comprises a fast charge line 33 for providing a relatively high constant current for charging the battery 31. A preferred value for the fast charging current is about 375 mA. This value of charging current has been found to be sufficient and adequate to charge various different sizes of batteries.

A trickle charge line 35 is connected to the output terminals 26 and 28, for providing a relatively low constant current for charging the battery 31. It has been found that the preferred value of the trickle charging current is about 25 mA.

Figure 2:
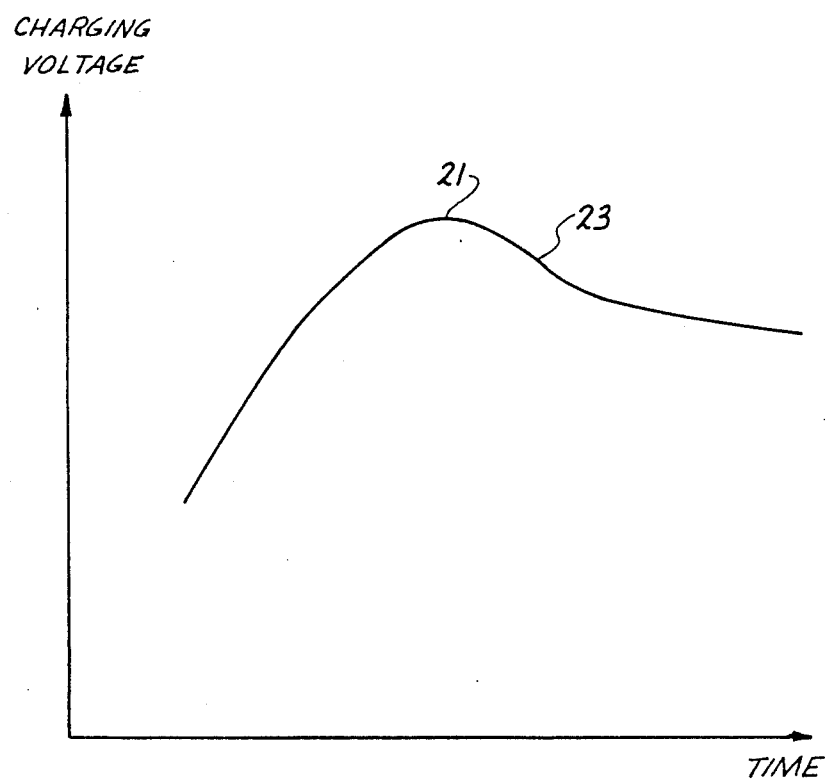
FIG. 2 is a voltage signal diagram representative of the charging voltage characteristic of the battery being charged by the charger of FIG. 1.

During a charging mode of operation, the low trickle current is supplied simultaneously with the higher charging current, until the battery 31 reaches its peak charging potential indicated at 21, as shown in FIG. 2. Thereafter, the fast charging current terminates abruptly, and only the lower trickle charging current continues to flow.

In order to regulate the current through the fast charge line 33, and to interrupt the flow of this current when the battery 31 is fully charged, following the negative peak charging voltage 21, a high charge regulator or transistor 37 is connected to the fast charge line 33. For the purpose of causing the transistor 37 to regulate or to interrupt the current flow, a flip flop 39 is reset, thus causing a differential amplifier 41, and a high current sense amplifier or transistor 43, to reduce greatly the current flowing to the base of the transistor 37, for controlling its conductivity.

For the purpose of resetting the flip flop 39, a charge-limit detector or differential amplifier 45 follows the charging voltage of the battery 31, and generates a flip flop resetting output signal when the battery 31 is fully charged, at the battery voltage negative slope 23. When the battery 31 is fully charged, the negative input of the differential amplifier 45 is maintained or clamped at a voltage corresponding to the constant peak reference potential 21 of the battery 31, while the positive input of the amplifier 45 responds to the negative slope battery charging characteristic as indicated at 23 of FIG. 1. Thus, a voltage difference across the inputs to the differential amplifier 45, causes the flip flop resetting output signal to be generated for terminating the high charging current abruptly, when the flip flop 39 switches and causes the reduction of base current to the transistor 37.

In order to maintain the negative input of the differential amplifier 45 clamped at the peak reference potential 21, a peak hold amplifier or differential amplifier 47 follows at its positive input the charging voltage of the battery 31, and generates a constant peak reference potential signal at its output, when the battery 31 reaches its peak charging voltage 21. The positive input terminal of the peak hold amplifier 47 is coupled to the positive terminal of the battery 31, through a normally on transmission gate 49, which causes a capacitor 50 to be charged by the charging current from the line 33. When the peak charging voltage 21 is reached, the transmission gate 49 is turned off, and the capacitor 50 is clamped at a peak reference potential for the positive input to the amplifier 47.

For the purpose of turning off the transmission gate 49, the negative input of a slope detector differential amplifier 51 follows the charging voltage of the battery 31, and has its positive input connected to the output of the peak hold amplifier 47, so that when the peak battery charging voltage 21 is reached, and then starts to decrease in the negative sloping portion of the battery charging characteristics at 23, a peak indicating signal is generated at the output of the slope detector differential amplifier 51. The peak indicating signal is supplied to the transmission gate 49, via a differential amplifier 52, and a sample and reset logic circuitry generally indicated at 54, to cause the transmission gate 49 to be turned off, thereby interrupting abruptly the current flowing to the capacitor 50.

The amplifier 52 causes the gate to be turned off, only after the battery voltage decreases by a predetermined amount below the peak voltage. In this regard, the charger 10 causes the termination of the fast charge current, only after the battery voltage decreases by 20 millivolts per battery cell (typically there may be about six to ten cells in the battery) below the peak charging voltage to a voltage at 23 of FIG. 2. Such a voltage 23 on the battery charging characteristic curve is desired for rechargeable batteries, such as nickel cadmium batteries. Also, by causing the switching to occur at lower voltage 23, rather than at peak voltage 21, mere fluctuations of the battery voltage, during the charging operation, is ignored automatically. The differential amplifier 45 for controlling the flip flop 39, also provides a similar function of causing the termination of the charging current, only after the charging voltage is reduced by a predetermined amount.

A reset detector differential amplifier 56 has its negative input connected to a constant reference potential, and has its positive input coupled to the trickle charge line 35. When the battery 31 is removed after being charged, the voltage at the positive input of the amplifier 56 rises above the reference potential at its negative terminal, and an output signal is consequently generated to set the flip flop 39 in preparation for the charging mode of operation for another discharged battery. The output signal also turns on the transmission gate 49 via the sample and reset circuitry 54, and another transmission gate 58, which causes the capacitor 50 to be discharged through a discharge path including the gates 49 and 58, and a resistor 167 to ground.

In operation, in order to charge a discharged battery 31 using the charger 10, a 110 volt a.c. power source is connected across the input terminals 12A and 12B to energize the transformer 16, for charging the battery 31 connected across the output terminals 26 and 28. Two charging currents are then being supplied in parallel, to the battery 31, via the fast charge line 33 and the trickle charge line 35, simultaneously. The battery 31 is then charged according to the voltage charging characteristic illustrated in FIG. 2.

The capacitor 50 follows the charging voltage of the battery 31, until the peak charging voltage 21 is reached. Whereupon, the transmission gate 49 interrupts abruptly the flow of charging current to the capacitor 50, to maintain a constant reference potential at the positive input to the peak hold amplifier 47, which, in turn, provides a clamped reference potential at the negative input of the charge limit detector amplifier 45.

When the charging voltage starts to decrease in the negative portion of the slope 23, the charge limit detector amplifier 45 generates an output signal, which resets the flip flop 39. The flip flop 39 then causes the differential amplifier 41, and the high current sense amplifier 43, to render non-conductive the high charge regulator or transistor 37, to terminate the current flowing through the fast charge line 33.

When the battery 31 is charged and then removed from the charger 10, the reset detector differential amplifier 56 generates a reset signal, which simultaneously sets the flip flop 39, and turns on both transmission gates 49 and 58, to cause the capacitor 50 to be discharged therethrough, in preparation for repeating the charging mode of operation.

Considering now the fast charge line 33 in greater detail, the input terminals 20 and 22 are connected across the bridge rectifier circuit 60 to a conductor 62, which, in turn, is connected at its opposite end to the collector of the transistor 37. The emitter of the transistor 37 is coupled to the output terminal 26 of the charger 10 via a negative feedback resistor 64, and a suitably poled diode 66.

The negative feedback resistor 64, the high current sense amplifier 43, and the differential amplifier 41, operate as a current regulator of the current, through the fast charge line 33, to maintain it at a constant level of about 375 mA. When the current passing through the fast charge line 33 varies, the voltage across the negative feedback resistor 64 follows such variation in the current, and produces a proportional voltage variation across the positive and negative inputs of the differential amplifier 41, via a pair of double-rail resistors 68 and 71, to provide the desired regulation.

The differential amplifier 41 has a capacitor 73 connected between its negative input and output terminals, and has its negative input connected to a constant reference potential of about +15 Volts, at a point 76, via a current limiting resistor 74. The reference potential at the point 76, is fed back to a reference input terminal of the differential amplifier 41. In order to obtain the constant reference potential of +15 volts, the point 76 is coupled to the bridge rectifier circuit 60, via a voltage regulator 78.

The differential amplifier 41 generates an output voltage, which is directly proportional to the variation in the amplitude of the current flowing through the fast charge line 33. For the purpose of controlling the conductivity of the transistor 43, a resistor 75 is connected between the output of the amplifier 41 and the base of the transistor 43. The collector of the transistor 43 is connected through a current limiting resistor 77 to the base of the transistor 37 for controlling its operation.

For the purpose of maintaining the transistor 43 conductive, a transistor 80 has its emitter connected to the conductor 62 through a current limiting resistor 82; and has its collector connected to the base of the transistor 37 to enable the transistor 80 to serve as a current source. The transistor 80 thus supplies current from the bridge rectifier circuit 60, to the collector of transistor 43 and the base of transistor 37. When the current in the fast charge line 33 increases, the transistor 43 becomes more conductive, thereby diverting the supply of current away from the base of transistor 37 and toward transistor 43, and causing less current to flow to the transistor 37. Consequently, the transistor 37 becomes less conductive in order to compensate for the increase of the amplitude of the current through the fast charge line 33, and for maintaining the fast charge current constant. Similarly, when the current in the fast charge line 33 decreases, the transistor 37 becomes more conductive, and the current is then stabilized.

Considering now the trickle charge line 35 in greater detail, a low current regulator or transistor 84 has its emitter connected to the conductor 62 via a current limiting resistor 86 to serve as a current source in a similar manner as the transistor 80. The transistor 84 has its base connected to the base of the transistor 80 at a point 88, and it also has its collector coupled to the terminal 26 of the charger 10 via a suitably poled diode 90. The point 88 is further coupled to the conductor 62 via a pair of suitably poled diodes 92 and 94, connected in series with one another. The point 88 is also connected to ground potential, via a current limiting resistor 96. So connected, the low current regulator transistor 84 regulates the current flow through the trickle charge line 35 and maintains it at a constant intensity.

Considering now the flip flop 39 in greater detail, for the purpose of interrupting the current flow through the fast charge line 33, when the peak charging voltage 21 is reached, the clock input CLK is connected to the output of the charge-limit detector differential amplifier 45, to reset the flip flop 39. The output Q' is connected for the purpose of controlling the amplifier 41, a current path 109 is connected between the Q' output of the flip flop 39 and the positive input to the amplifier 41. The path 109 includes a current limiting resistor 105 and a suitably poled diode 107.

When the battery 31 is being charged, the flip flop 39 is set, and the output Q' is low relative to the potential at the point 103. Thus, the diode 107 causes the interruption of the flow of current through the conductor path 109. When the charging voltage reaches the voltage 23 (FIG. 2), the charge-limit detector 45 generates a negative slope indicating output signal at the input CLK terminal of the flip flop 39, to reset it, thereby causing its output terminal Q' to become high relative to the positive input of the differential amplifier 41. Thus, the diode 107 becomes conductive, and the transistor 43 saturates, or at least becomes more conductive, to divert the supply current from the base of the transistor 37, through the transistor 43 to ground. Thus, the transistor 37 is turned off, and the high current flow terminates abruptly, through the fast charge line 33.

A visual indicating sensor system 111 is connected between the flip flop 39, and the bridge rectifier circuit 60, to provide a visual indication of the charging status of the fast and trickle charge lines 33 and 35. The system 111 generally comprises a light emitting diode 113, which is energized to indicate the charging of the battery 31 through the trickle charge line 35. The light emitting diode 113 is connected at one end to the bridge rectifier circuit 60, and has its other end coupled to the output Q of the flip flop 39, via a current limiting resistor 117, the collector-base junction of a transistor 119, a resistor 120, and a logic gate 121. Similarly, a light emitting diode 115 is energized when the battery 31 is being charged through the fast charge line 33. The light emitting diode 115 is energized at one end by the bridge rectifier circuit 60, while the other end is coupled to the output Q' of the flip flop 39, via a current limiting resistor 123, disposed in series with the collector-base junction of a transistor 125, through a resistor 126, and a logic gate 127.

Considering now the charge-limit detector 45 in greater detail, it has an output terminal which is connected to the CLK input of the flip flop 39. The output terminal is also connected to its positive input terminal via a feedback resistor 129. The positive input terminal is also coupled to a point 130, between a pair of current limiting resistors 132 and 134.

The resistors 129 and 132 provide a voltage divider for the differential amplifier 45, so that it responde only when the voltage of the battery 31 is at voltage 23 (FIG. 2), as explained in connection with the amplifier 52. Thus, when the voltage 23 is reached, the amplifier 45 resets the flip flop 45, and the amplifier 52 causes the gate 49 to be opened, so that the capacitor 50 is prevented from discharging during the trickle charge mode.

The resistor 134 is connected between the point 130 and a current limiting resistor 136, which, in turn, is connected to a resistor 138. The resistor 138 is a variable resistance, and is connected, in turn, to the fast charge line 33 at a point 142 between the resistor 64 and the positive input of the diode 66.

The negative input of the charge-limit detector 45 is coupled to the output of the peak hold amplifier 47, via a current limiting resistor 140. The peak hold amplifier output is fed back to its negative input. The positive input of the peak hold amplifier 47 is connected to a ground reference potential via the capacitor 50, and it is further coupled to the fast charge line 33, at point 142, via the transmission gate 49, and a current limiting resistor 144. A resistor 146 has one end connected to a point 147 between the transmission gate 49, and the resistor 144, and has its other end connected to ground potential.

Considering now the slope detector differential amplifier 51 in greater detail, it has a negative input terminal which is connected to a point 151 between the current limiting resistors 134 and 136. The negative input terminal of the detector differential amplifier 51, is fed back to its output terminal through a capacitor 153. The positive input terminal of the detector differential amplifier 51 is coupled to the output of the differential amplifier 47 via a current limiting resistor 155, and it is also coupled to a point 158 between a pair of resistors 159 and 161, through a current limiting resistor 157. The resistor 159 is connected between the point 158 and a, +15 volt constant reference potential through a conductor 163.

The resistor 161 is connected between the point 158, and a junction point 165. A resistor 167 is connected between the point 165, and ground potential. A resistor 169 is connected between the point 165, and the positive input terminal of the sample detector differential amplifier 52.

The output terminal of the slope detector differential amplifier 51, is coupled to the negative input terminal of the sample detector differential amplifier 52 via a current limiting resistor 172. The output terminal of the sample detector differential amplifier 52 is connected to the input of the sample and reset logic circuitry 54, and it is further fed back to the positive input of the differential amplifier 52, via a resistor 70. The sample and reset logic circuitry 54 comprises a pair of logic gates 174 and 176, which are connected between the output of the sample detector differential amplifier 52, and the transmission gate 49.

For the purpose of setting the flip flop 39, and for discharging the capacitor 50, in preparation for another recharging cycle, when the charged battery 31 is removed from the charger 10, the reset detector differential amplifier 56 has its negative input terminal coupled to the constant reference potential at the point 76, via a pair of current limiting resistors 178 and 180, which, in turn, are connected at a point 182. The junction point 182 is coupled to the reference point 76, via a suitably poled isolation diode 184. The point 182 is further coupled to ground potential via a capacitor 186.

The positive input terminal of the reset detector differential amplifier 56 is coupled to the trickle charge line 35, via a current limiting resistor 188, and a time delay resistor 190, which, in turn, are joined at a point 198. A time delay capacitor 192 is connected between the point 198, and a normally off transmission gate 194.

The output terminal of the reset detector differential amplifier 56 is connected to the input terminal S of the flip flop 39, and it is further connected to the normally off transmission gate 58, and the logic gate 174 of the sample and reset logic circuitry 54.

The feedback resistor 170 and the resistor 169 serve as a voltage divider in the same manner as the resistors 129 and 132 for the amplifier 45. In both situations, the voltage dividers provide the desired hysterisis effect.

The charger 10 is designed to delay switching from the trickle charge mode to the fast charge mode for a predetermined period of time. The delay is desirable when an accidental jarring of the charger 10 causes a momentary loss of proper contact, and simulates an opened circuit condition across the output terminals 26 and 28. For the purpose of delaying the switching from the trickle charge mode to the fast charge mode, a delay circuitry 202 is provided.

The delay circuitry 202 generally comprises a time delay capacitor 192, a time delay resistor 190, and a normally off transmission gate 194. When the battery 31 is being charged through the fast charge line 33, the flip flop 39 is in a set condition, and generates a low signal at its output terminal Q'. When the peak charging voltage 21 is reached, the flip flop 39 is caused to be reset, and to generate a high reset signal at the output terminal Q'. The high reset signal causes the transmission gate 194 to be turned on, and to be rendered conductive. Thus, the time delay capacitor 192 charges, and maintains the positive input terminal of the reset detector differential amplifier 56 at a high potential relative to the negative input of the differential amplifier 56, for preventing the instantaneous generation of an output reset signal at the output terminal of the differential amplifier 56. In this regard, the generation of an output signal is undesirable under the simulated opened conditions, since, such output signal would set the flip flop 39, and would cause the capacitor 50 to be discharged, in preparation for another recharging cycle through the fast charge line 33.

It has been found that the following values and types of components used in the charger 10, or equivalent components, are as follows:

| DESCRIPTION/REFERENCE | VALUE |
| --- | --- |
| Transformer 16 | 15 V/20 VA |
| Capacitor 204 | 1000 Microfarads |
| Regulator 78 | VA78M |
| Capacitor 206, 186, 192 | 10 Microfarads |
| Diode 210, 212, 214, 216, 208, 66, 90 | 1N4001 |
| Transistor 80, 84 | PN2507 |
| Transistor 37 | TIP31 |
| Transistor 43, 119, 125 | PN2N722 |
| Amplifier 41 | LM3900N |
| Amplifier 47 | LF353N |
| Logic Gate 121 | CD4001BCN |
| Diode 94, 92, 107, 184, | 1N4148 |
| Resistor 82, 86 | 22 Ohms |
| Resistor 96, 75, 120, 172 | 22K Ohms |
| Resistor 68, 71, 155 | 820K Ohms |
| Resistor 64 | 1.8 Ohms |
| Resistor 77 | 100 Ohms |
| Resistor 180 | 120K Ohms |
| Resistor 178 | 100K Ohms |
| Resistor 188, 144 | 270K Ohms |
| Capacitor 73, 153 | 220 Picofarads |
| Capacitor 50 | 1 Microfarads |
| Resistor 132 | 220K Ohms |

-continued

| DESCRIPTION/REFERENCE | VALUE |
| --- | --- |
| Resistor 146, 136 | 1 M Ohms |
| Resistor 105 | 10 M Ohms |
| Resistor 74, 129, 134, 157 | 22 M Ohms |
| Resistor 138 | 100K Ohms |
| Resistor 190 | 47K Ohms |
| Resistor 140 | 470K Ohms |
| Resitor 161, 169, 167, 117, 123 | 2.2K Ohms |
| Diode 115 | REDLED |
| Diode 113 | GRNLED |

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

We claim:

1. A battery charger for charging a battery, comprising:
   a fast charge line, connected to the battery, for providing a constant high charging current thereto, and for causing the battery to be charged in a high charge mode;
   a trickle charge line, connected to the battery, for providing a constant low charging current thereto simultaneously with the high charging current, and for causing the battery to be charged in a trickle charge mode;
   a current regulating means, connected to said fast charge line, for regulating the high charging current flowing therein;
   a slope detecting means, responsive to the battery being charged, for generating a battery voltage peal indicating signal, when the voltage starts to decrease following the peak charging voltage of the battery;
   said slope detecting means including means for following the battery voltage and retaining it for predetermined periods of time;
   said slope detecting means including means for comparing the retained voltage and the present voltage to generate said peak indicating signal when the present battery voltage is less than the retained battery voltage; and
   a peak holding means, responsive to said peak indicating signal, to cause the charger to switch abruptly from the high charge mode to the low trickle charge mode.

2. A battery charger according to claim 1, wherein said slope detecting means comprises a differential amplifier.

3. A battery charger according to claim 1, wherein said peak holding means comprises a differential amplifier.

4. A battery charger according to claim 1, wherein said peak holding means includes a differential amplifier responsive to said peak indicative signal, to cause said current regulating means to terminate the high charging current through said fast charge line, only after the battery voltage decreases by a predetermined amount below the peak charging voltage.

5. A battery charger aooording to claim 4, further comprising means responsive to the signal at the output of said differential amplifier, for controlling said current regulating means.

6. A battery charger according to claim 1, which further comprises a first visual indicator sensing means for providing a visual indication of the charging status of said fast charge line.

7. A battery charger according to claim 6, which further comprises a second visual indicator sensing means for providing a visual indication of the charging status of said trickle charge line.

8. A battery charger for charging a battery, comprising:
   a fast charge line, connected to the battery, for providing a constant high charging current thereto, and for causing the battery to be charged in a high charge mode;
   a trickle charge line, connected to the battery, for providing a constant low charging current thereto, and for causing the battery to be charged in a trickle charge mode;
   current regulating means, connected to said fast charge line, for regulating the high charging current flowing therein;
   slope detecting means, responsive to the battery being charged, to generate a peak indicating signal, when the voltage starts to decrease following the peak charging voltage of the battery;
   peak holding means, responsive to said peak indicating signal, to cause the charger to switch abruptly from the high charge mode to the low trickle charge mode;
   said peak holding means comprising a differential amplifier; and
   said peak holding means further comprising a capacitor for being charged through said fast charge line, to a predetermined potential.

9. A battery charger according to claim 8, which further comprises switching means responsive to said peak indicating signal, for terminating the current flowing to said capacitor through said fast charge line.

10. A battery charger according to claim 9, wherein said slope detecting means further comprises a second differential amplifier, for causing said switching means to be turned off only after the battery voltage decreases by a predetermined amount below the peak charging voltage.

11. A battery charge according to claim 10, wherein said switching means comprises a transmission gate.

12. A battery charger according to claim 11, wherein said switching means comprises a logic curcuit responsive to the signal at the output of said second differential amplifier, for causing said transmission gate to be turned off.

13. A battery charger according to claim 10, wherein said second differential amplifier comprises a voltage divider circuit for providing a desired hysterisis effect.

14. A battery charger according to claim 8, which further comprises a reset detecting means, responsive to said low charging current flowing through said trickle charge line, for resetting the charger in preparation for a high charge mode, when the battery is removed from the charger.

15. A battery charger according to claim 8, further including a charge limit detector means for generating an output signal indicative of the peak charging voltage.

16. A battery charger according to claim 15, wherein said charge limit detector means includes a differential amplifier.

17. A battery charger according to claim 16, wherein said peak holding means includes a differential amplifier.

18. A battery charger according to claim 17, wherein said peak holding differential amplifier follows at its positive input the charging voltage of the battery, and generates a constant peak reference potential at its output, when the battery reaches its peak charging voltage.

19. A battery charger according to claim 18, wherein the positive input terminal of the peak holding differential amplifier is coupled to the battery through a transmission gate, and a capacitor; and
wherein said transmission gate causes said capacitor to be charged by the constant high charging current through said fast charge line.

20. A battery charger according to claim 19, wherein said transmission gate is turned off and said capacitor is clamped at a peak reference potential when the peak charging voltage is reached.

21. A battery charger according to claim 20, further including a sample and reset logic circuitry.

22. a battery charger according to claim 21, wherein said sample and reset logic circuitry includes at least one logic gate.

23. A battery charger according to claim 22, wherein said current regulating means includes a flip flop.

24. A battery charger for charging a battery, comprising:
a fast charge line, connected to the battery, for providing a constant high charging current thereto, and for causing the battery to be charged in a high charge mode;
a trickle charge line, connected to the battery, for providing a constant low charging current thereto, and for causing the battery to be charged in a trickle charge mode;
current regulating means, connected to said fast charge line, for regulating the high charging current flowing therein;
slope detecting means, responsive to the battery being charged, to generate a peak indicating signal, when the voltage starts to decrease following the peak charging voltage of the battery;
peak holding means, responsive to said peak indicating signal, to cause the charger to switch abruptly from the high charge mode to the low trickle charge mode; and
wherein said current regulating means comprises a differential amplifier and at least one transistor.

25. A battery charger for charging a battery, comprising:
a fast charge line, connected to the battery, for providing a constant high charging current thereto, and for causing the battery to be charged in a high charge mode;
a trickle charge line, connected to the battery, for providing a constant low charging current thereto, and for causing the battery to be charged in a trickle charge mode;
current regulating means, connected to said fast charge line, for regulating the high charging current flowing therein;
slope detecting means, responsive to the battery being charged, to generate a peak indicating signal, when the voltage starts to decrease following the peak charging voltage of the battery;
peak holding means, responsive to said peak indicating signal, to cause the charger to switch abruptly from the high charge mode to the low trickle charge mode;
wherein said peak holding means comprises a differential amplifier and a capacitor, said capacitor being adapted to be charged through said fast charge line, to a certain potential;
reset detecting means, responsive to said low charging current flowing through said trickle charge line, for resetting the charger in preparation for a high charge mode, when the battery is removed from the charger; and
wherein said reset detecting means comprises a switching means for causing said capacitor to be discharged therethrough, in preparation for getting recharged when a discharged battery is connected across the output of the charger.

26. A battery charger for charging a battery, comprising:
a fast charge line, connected to the battery, for providing a constant high charging current thereto, and for causing the battery to be charged in a high charge mode;
a trickle charge line, connected to the battery, for providing a constant low charging current thereto, and for causing the battery to be charged in a trickle charge mode;
current regulating means, connected to said fast charge line, for regulating the high charging current flowing therein;
slope detecting means, responsive to the battery being charged, to generate a peak indicating signal, when the voltage starts to decrease following the peak charging voltage of the battery;
peak holding means, resposive to said peak indicating signal, to cause the charger to switch abruptly from the high charge mode to the low trickle charge mode;
timing means for delaying the switching back of the charger from the trickle charge mode to the high charge mode, when an accidental jarring of the charger causes a momentary loss of proper contact; and
wherein said timing means includes a time delay resistor, a time delay capacitor, and a normally off time delay switch.

27. A battery charger according to claim 26, wherein said time delay switch comprises a transmission gate.

28. A battery charger for charging a battery, comprising:
a fast charge line, connected to the battery, for providing a constant high charging current thereto, and for causing the battery to be charged in a high charge mode;
a trickle charge line, connected to the battery, for providing a constant low charging current thereto, and for causing the battery to be charged in a trickle charge mode;
current regulating means, connected to said fast charge line, for regulating the high charging current flowing therein;
slope detecting means, responsive to the battery being charged, to generate a peak indicating signal, when the voltage starts to decrease following the peak charging voltage of the battery;
peak holding means, responsive to said peak indicating signal, to cause the charger to switch abruptly from the high charge mode to the lwo trickle charge mode;

a differential amplifier responsive to said peak indicating signal, to cause said current regulating means to terminate the high charging current through said fast charge line, only after the battery voltage decreases by a predetermined amount below the peak charging voltage; and said differential amplifier including a voltage divider circuit for providing a desired hysteresis effect.

29. A battery charger for charging a battery, comprising:

a fast charge line, connected to the battery, for providing a constant high charging current thereto, and for causing the battery to be charged in a high charge mode;

a trickle charge line, connected to the battery, for providing a constant low charging current thereto simultaneously with the high charging current, and for causing the battery to be charged in a trickle charge mode;

a current regulating means, connected to said fast charge line, for regulating the high charging current flowing therein;

a slope detecting means, responsive to the battery being charged, for generating a battery voltage peak indicating signal, when the voltage starts to decrease following the peak charging voltage of the battery;

said slope detecting means including means for following the battery voltage and retaining it for predetermined periods of time;

said slope detecting means including means for comparing the retained voltage and the present voltage to generate said peak indicating signal when the present battery voltage is less than the retained battery voltage;

a peak holding means, responsive to said peak indicating signal, to cause the charger to switch abruptly from the high charge mode to the low trickle charge mode; and timing means for delaying the switching back of the charger from the trickle charge mode to the high charge mode, when an accidental jarring of the charger causes a momentary loss of proper contact.

* * * * *

UNITED STATES PATENT AND TRADEMARK OFFICE
CERTIFICATE OF CORRECTION

PATENT NO. : 4,767,977
DATED : Aug. 30, 1988
INVENTOR(S) : Kenneth R. Fasen, Kim R. Rogers, Lee J. Schwartz It is certified that error appears in the above-identified patent and that said Letters Patent is hereby corrected as shown below:

Column 2, line 59    after "12B", please delete "aoross", and substitute therefor -- across --.

Column 6, line 64    after "it", please delete "responde", and substitute therefor -- responds --.

Column 9, line 37    after "indicating", please delete "peal", and substitute therefor -- peak --.

Signed and Sealed this

Thirteenth Day of June, 1989

Attest:

DONALD J. QUIGG

Attesting Officer    Commissioner of Patents and Trademarks